United States Patent [19]

Herron et al.

[11] 3,964,104
[45] June 15, 1976

[54] INTERMITTENT CLEANER FOR ROTATING MAGNETIC HEAD

[75] Inventors: Christopher C. Herron; Clyde R. Williams, both of Boulder, Colo.

[73] Assignee: International Business Machines Corporation, Armonk, N.Y.

[22] Filed: Mar. 31, 1975

[21] Appl. No.: 563,889

[52] U.S. Cl. .............................. 360/128; 15/210 R
[51] Int. Cl.² ..................... G11B 5/41; A47L 25/00
[58] Field of Search ............. 360/128, 137; 274/47; 15/210 R

[56] References Cited
UNITED STATES PATENTS

| | | | |
|---|---|---|---|
| 3,266,196 | 8/1966 | Barcaro | 360/128 |
| 3,370,982 | 2/1968 | Hayunga | 360/137 |
| 3,443,037 | 5/1969 | Dann | 360/128 |
| 3,449,528 | 6/1969 | Camras | 360/128 |

*Primary Examiner*—Robert S. Tupper
*Attorney, Agent, or Firm*—Homer L. Knearl

[57] ABSTRACT

Disclosed herein is a head cleaner for cleaning a rotating magnetic head without interrupting the operation of the tape drive using the rotating magnetic head. The cleaning is achieved by mounting an idler brush wheel at an angle to the path of the rotating head. The brush wheel makes contact with the head and with the surface of the rotor carrying the magnetic head. The rotary motion of the rotor is transmitted to the idler brush wheel causing the brush to rotate. The actions of the bristles of the brush wheel as it contacts the rotor and the magnetic head creates a brushing action at an angle to the path of the head and rotor. The bristles flick or brush dirt from the surface of the rotating magnetic head and from the rotor carrying the magnetic head. The head cleaning operation is intermittent; the idler brush wheel is in contact with the rotor for a one second interval or for approximately 50 rotations of the rotor. In addition, a vacuum is applied to the cavity surrounding the idler brush wheel so that debris created by the brushing action will be drawn by the vacuum away from the rotating head.

9 Claims, 3 Drawing Figures

INTERMITTENT CLEANER FOR ROTATING MAGNETIC HEAD

BACKGROUND OF THE INVENTION

Field of the Invention

This invention relates to maintaining a high performance, rotating-head, magnetic tape recorder. More particularly, the invention relates to cleaning the rotating head automatically and without operator intervention whereby the reliability of the rotating head magnetic tape recorder is greatly enhanced.

HISTORY OF INVENTION

In high-frequency magnetic tape recording using rotating magnetic heads, the head has typically been run in contact with the magnetic tape to achieve a high quality recorded signal on the magnetic tape. More recently, it has been found that by flying the head in a controlled manner within tens of microinches of the surface of the tape, acceptable high quality recording can be achieved on the tape. In either of these recording techniques, the head carried by the rotor tends to become dirty within a few hours of use due to the oxide debris from the magnetic tape. Debris on a rotating head, especially on a head flying a few tens of microinches above the tape surface, can cause crashes between the flying head and the tape. The result of these crashes is excessive wear on the head and scarring of the magnetic tape oxide surface.

In the past, maintenance of a rotating magnetic head has been accomplished by powering down the magnetic tape drive, and by having service personnel either chemically wash the magnetic head or replace the magnetic head. At best such a procedure consumes forty-five minutes to an hour every few hours of operation of the rotating-head recorder. If the recorder is a part of a large storage system, loss of the recorder for a portion of an hour every few hours is extremely costly.

It is the object of this invention to automatically clean a rotating head without interrupting the normal operation of the rotating-head magnetic tape recorder.

SUMMARY OF THE INVENTION

In accordance with this invention, the above object has been accomplished by bringing an idler brush wheel intermittently into contact with the rotor carrying the rotating head. The idler brush is positioned at a small angle relative to the rotor so that motion of the rotor past the idler brush drives the brush and also creates a brushing action between the brush and the rotor surface. The duration of the contact between the brush and the rotor surface and the penetration of the rotor surface into the brush are selected to achieve a cleaning action without creating excessive heat to the brush. Cleaning of the rotor surface and the head on the rotor surface is done intermittently at some convenient time during the operation of the magnetic tape recorder. For example, the head cleaning might occur each time tape is unloaded from the rotor.

As a further feature of the invention, a vacuum is applied to the cavity surrounding the brush whereby debris created by the brushing action is drawn away from the rotor and rotating head.

As yet a further feature, the cover for the brush assembly and the brush itself are easily removed so that at service intervals in the order of several months apart, service personnel can replace the idler brush wheel.

The foregoing and other objects, features and advantages of the invention will be apparent from the following more particular description of a preferred embodiment of the invention as illustrated in the accompanying drawings.

DETAILED DESCRIPTION OF PREFERRED EMBODIMENT

Figure 1:
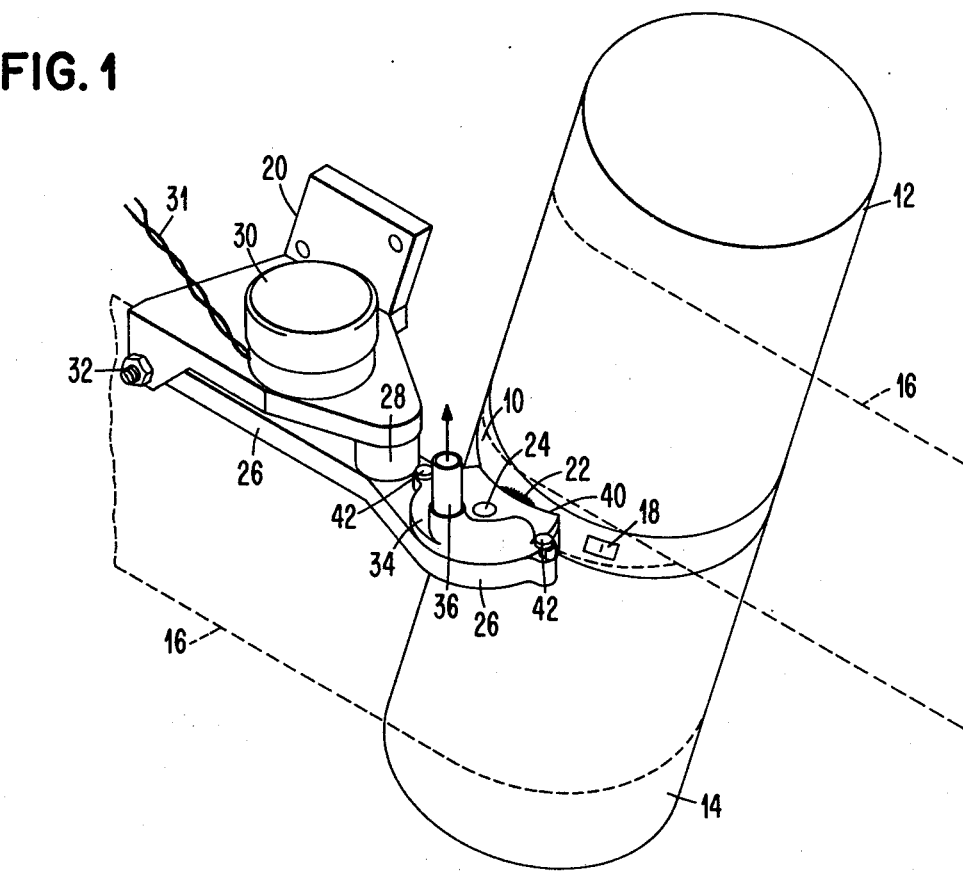
FIG. 1 shows the head cleaning assembly with the head cleaner in position to clean the surface of a rotor carrying a magnetic head.

In FIG. 1, the head cleaner assembly is shown in position for cleaning the rotor 10. Rotor 10 is bounded by fixed mandrel halves 12 and 14. Magnetic tape 16 is shown wrapped about the mandrel and across the path of the head 18 carried by rotor 10. The head cleaning assembly is mounted by bracket 20 to the same fixture (not shown) that holds the mandrel halves 12 and 14 in position.

Idler brush wheel 22 is mounted on a shaft 24 at the end of arm 26. Arm 26 pivots about shaft 28 to swing the brush wheel 22 into and out of contact with the rotor and rotating head 18. Arm 26 is moved by rotary solenoid 30. The actuation of the arm 26 to bring the brush into contact with the rotor 10 will be described hereinafter with reference to FIG. 3.

In FIG. 1 for the normal or nonactive position of the solenoid 30, the brush wheel 22 is not in contact with rotor 10. When the solenoid 30 is activated, then the arm 26 is moved until it contacts penetration adjustment screw 32. Penetration adjustment screw 32 controls the mount of penetration by the rotor 10 and the head 18 into the brush 22.

The idler brush wheel 22 at the end of arm 26 rotates about a plastic shaft 24. Brush 22 lies in a cavity at the end of the arm 26. Cover 34 covers the cavity to house the brush 22 and contains a vacuum port 36. When a vacuum is applied from a vacuum source to the vacuum port 36, the air is drawn in through the mouth 40 of the cavity where the idler brush wheel is in contact with the rotor 10. Any debris created by the brushing action between the brush 22 and the rotor 10 or the rotating head 18 is drawn by the vacuum into the cavity and out the vacuum port 36.

For serviceability, the cover 34 is snap fastened to pins 42 on the arm 26. With cover 34 removed, the idler brush wheel 22 will slide off the shaft 24 and may be replaced periodically. A reasonable life of the brush would be in the order of 3 months or over 75,000 cleaning cycles.

The shaft 24 on which the brush 22 rotates is made of RULON (Trademark of Dixon Corporation) plastic. The brush 22 fits this hub or shaft 24 snugly but rotates easily about the shaft. During the cleaning operation the rotor speed is approximately 3,000 revolutions per minute. The rotor is approximately 3½ inches in diameter while the idler brush wheel 22 is approximately 1 inch in diameter. Even though the idler brush wheel is much smaller in diameter than the rotor, the brush 22 rotates at approximately the same rpm as the rotor. The brush 22 rotates somewhat slower than expected due to drag on the brush from the shaft 24 and from the walls of the cavity containing the brush, and also due to the angle that the brush wheel 22 makes with the rotor 10.

Figure 2:
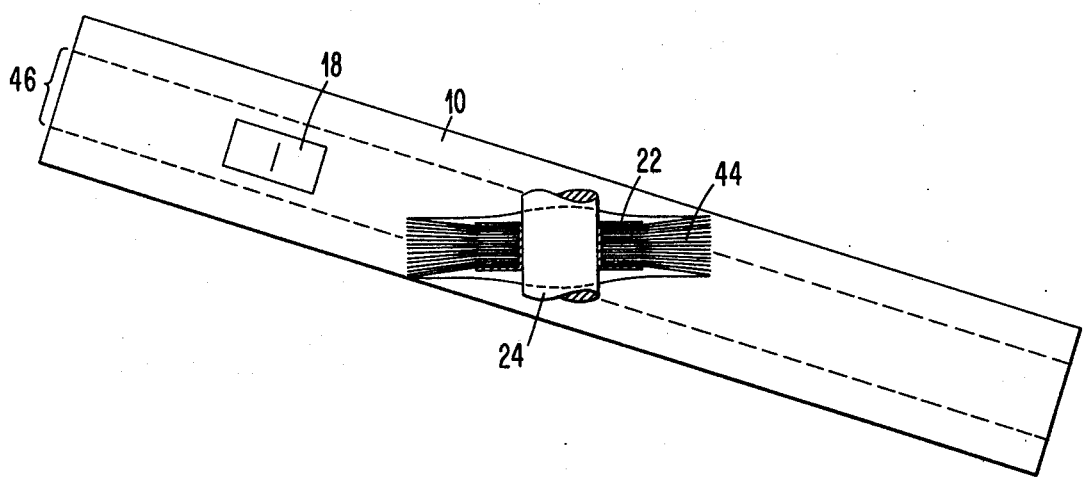
FIG. 2 shows the positional relationship between the idler brush wheel of the cleaner and the rotor carrying the magnetic head.

In FIG. 2, the angular relationship between the axis of the brush and the axis of the rotor is shown. The angular relationship between the brush wheel 22 and the rotor 10 assists the brushing action achieved between the bristles 44 and the surface of the rotating head 18 or the rotor 10. As discussed above, the rpm of the brush 22 and the rotor 10 are approximately the same while their diameters are significantly different. Thus, there is a significant difference in surface velocity between the bristles 44 of brush 22 and the surface of the rotor 10. This difference in surface velocity accounts for the presence of a brushing action between the bristles and the surface rotor without the necessity of driving the brush wheel.

Rotor 10 as depicted in this invention might be, for example, a crowned rotor as described in copending commonly assigned application Ser. No. 488,341 filed July 15, 1974, and entitled "Rotating Head Apparatus Having a Protruding Diameter Headwheel Which Supports a Protruding Flying Head." With such a rotor and with the brush 22 positioned so that the rotor penetrates into the brush approximately 0.012 to 0.014 of an inch, the bristles 44 sweep about half the width of the surface of rotor 10. The swept width 46 of the surface of the rotor 10 is defined by the dashed lines on rotor 10 in FIG. 2.

Within the swept width 46, the rotating head 18 is positioned. The head 18 might be configured, for example, as described in copending, commonly assigned patent application Ser. No. 486,028, filed July 5, 1974, and entitled "Slotted Rotating Head Which Flies Relative to Flexible Magnetic Media." As the rotor 10 rotates under bristles 44 of brush 22, head 18 is moved under the brush once per revolution of the rotor 10. During a cleaning operation, the head 18 is moved past and under the bristles 44 of brush 22 approximately fifty times. This cleaning operation occurs periodically and might typically be each time a tape is loaded or unloaded from the tape recorder.

Figure 3:
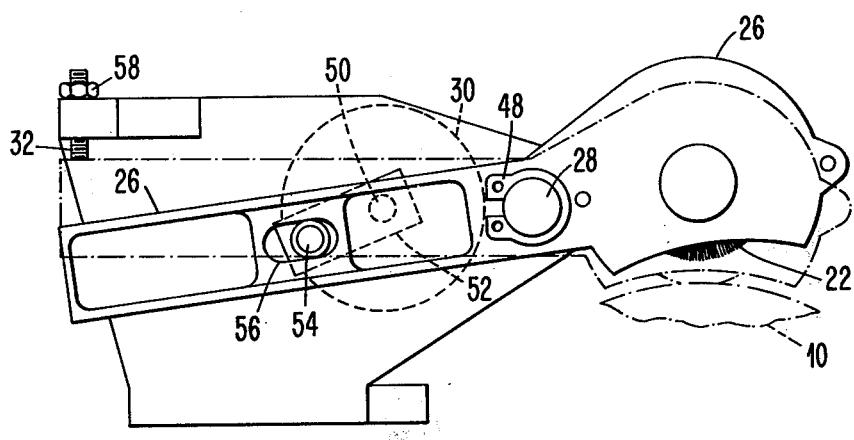
FIG. 3 shows the actuating mechanism for moving the idler brush into and out of contact with the rotor.

Now referring to FIG. 3, the actuating mechanism for moving the brush 22 into contact with the rotor 10 is shown. Rotary solenoid 30 is the motive force to pivot the brush arm 26 about shaft 28. Arm 26 is held on shaft 28 by spring clip 48.

The normal position of arm 26 and brush 22 (unenergized solenoid position) is shown in solid lines in FIG. 3. The active position of arm 26 and brush 22 (rotary solenoid energized) is shown in phantom in FIG. 3.

Rotary solenoid 30 moves arm 26 by rotating shaft 50. Mounted on shaft 50 is an arm 52 that carries a pin 54 at its end. Pin 54 engages a slot 56 in the arm 26. When the rotary solenoid 30 is energized, shaft 50 and arm 52 rotate clockwise. Pin 54 carries arm 26 with it so that arm 26 rotates clockwise until arm 26 strikes the penetration adjustment screw 32. Contact between arm 26 and screw 32 limits the rotation of arm 26 and thus, fixes the position of brush 22 against rotor 10. Adjustment screw 32 is set so that the rotor 10 penetrates the brush 22 approximately 0.012 to 0.014 of an inch. When the penetration adjustment is correct, screw 32 is fixed in position by tightening down nut 58.

In operation, the rotary solenoid 30 is energized each time tape is unloaded from the tape recorder. Rotary solenoid 30 holds the brush 22 in contact with the rotor 10 for approximately one second. During one second at approximately 3,000 rpm for the rotor, the head rotor will be swept by the brush 50 times. There is nothing critical about the number of times that the brushing action occurs; however, the amount of penetration and the velocity of the rotor, the bristles used in the brush 44 and the drag on the brush all affect the heat buildup during a cleaning operation. It has been found that with nylon TYNEX (Trademark of E. I. duPont de Nemours & Company, Inc.) bristle brushes, good wear life can be achieved, in excess of 75,000 cycles of cleaning.

While the invention has been particularly shown and described with reference to the preferred embodiment, it will be appreciated by one skilled in the art that other actuating mechanisms, other brush materials and other cycles of operation might be chosen without departing from the spirit and scope of the invention.

What is claimed is:

1. Apparatus for cleaning a magnetic head mounted on a rotor in a rotating-head magnetic tape recorder comprising:
    an idler brush wheel rotatably mounted about a shaft and having bristles in contact with the rotor carrying the magnetic head;
    said shaft of said idler brush wheel mounted relative to the rotor so that the rotor penetrates into the brush causing the bristles of the brush to flex and brush dirt from the surface of the rotor;
    means for driving the rotor during the cleaning operation whereby the drive of the rotor in contact with the rotatably mounted idler brush wheel causes said idler brush wheel to rotate;
    the axis of said rotor and the axis of said idler brush wheel having an acute angle therebetween whereby the rotary motion of the rotor and said idler brush wheel create a brushing action across the surface of the rotor and the head carried by the rotor.

2. The apparatus of claim 1 and in addition:
    an arm carrying the shaft of said idler brush wheel and means pivotally mounting said arm whereby said idler brush wheel may be swung into contact with the surface of said rotor and the head carried by said rotor;
    means for moving said arm to bring said idler brush wheel into contact with said rotor intermittently whereby said rotor and the head carried by said rotor are automatically cleaned without interrupting the normal operation of the rotating-head magnetic tape recorder.

3. The apparatus of claim 2 and in addition:
    means for adjusting the limits on the movement of said arm whereby the penetration of said idler brush wheel by said rotor can be adjusted.

4. The apparatus of claim 1 and in addition:
    housing means surrounding said idler brush wheel except for a mouth in said housing means out of which the idler brush wheel protrudes to contact the surface of said rotor;
    means for applying a vacuum to said housing means for evacuating debris from the area of said idler brush wheel and said rotor created by the brushing action of the brush on the surface of the rotor.

5. The apparatus of claim 4 wherein said housing means is formed by a hollow in said arm and a removable cover snap-fastened to said arm whereby the removable cover can be unsnapped from the arm to permit service of said idler brush wheel.

6. Method for cleaning a head and a rotor carrying the head in a rotating-head magnetic tape recorder comprising the steps of:
- rotating the rotor carrying the magnetic head;
- contacting the surface of said rotor with a free-wheeling rotary brush having an axis of rotation making an acute angle with the axis of rotation of said rotor;
- penetrating said rotor into the bristles of said brush so that contact between the rotor and the brush creates a flexure of the bristles and also creates a rotary motion of the free-wheeling brush whereby the brushing action across the surface of the rotor and the head cleans the rotor and the head.

7. The method of claim 6 and in addition the step of: applying a vacuum in the vicinity of said free-wheeling brush whereby debris created by the brushing action is evacuated from said brush, rotor and head.

8. The method of claim 6 and in addition the step of: intermittently swinging said free-wheeling brush into contact with said rotor whereby said rotor is in contact with said brush for a small number of rotations by said rotor without interrupting the normal operation of the rotating-head magnetic tape recorder.

9. The method of claim 8 and in addition the step of: adjusting the limit of the swing of said free-wheeling brush as the brush contacts said rotor whereby the penetration of said rotor into said brush is adjusted.

* * * * *